United States Patent [19]

Sailer

[11] 4,157,010

[45] Jun. 5, 1979

[54] GAS TURBINE ENGINE WITH POWER MODULATION CAPABILITY

[75] Inventor: Edward D. Sailer, Cincinnati, Ohio

[73] Assignee: General Electric Company, Cincinnati, Ohio

[21] Appl. No.: 803,090

[22] Filed: Jun. 3, 1977

[51] Int. Cl.² ............................ F02C 7/00; F02C 7/02
[52] U.S. Cl. .................................. 60/39.04; 60/39.17
[58] Field of Search ................... 60/39.04, 39.17, 262, 60/39.03, 39.16, 39.23

[56] References Cited

U.S. PATENT DOCUMENTS

| | | | |
|---|---|---|---|
| 2,257,982 | 10/1941 | Seippel | 60/39.17 |
| 2,312,995 | 3/1943 | Anxionnaz et al. | 60/39.17 |
| 2,608,055 | 8/1952 | Welsh | 60/39.04 |
| 2,703,477 | 3/1955 | Anxionnaz | 60/262 |
| 2,738,645 | 3/1956 | Destival | 60/39.17 |
| 3,041,822 | 7/1962 | Embree | 60/39.17 |

Primary Examiner—Louis J. Casaregola
Attorney, Agent, or Firm—Robert C. Lampe, Jr.; Derek P. Lawrence

[57] ABSTRACT

A device is provided for increasing the power output of a gas turbine engine at the low ambient inlet temperatures which would otherwise produce a decrease in power. The device includes a conduit for bypassing a portion of the compressor discharge air around the combustor whereupon it is reintroduced back into the engine downstream of the compressor-driving turbine and upstream of the power turbine, if any. A valve is provided to increase the bypass flow rate through the conduit at low ambient temperatures, the increasing bypass flow permitting the engine to operate at a higher fuel flow and cycle temperatures for the same compressor mass flow. The increased temperature with the same mass flow rate results in an increase in power.

3 Claims, 4 Drawing Figures

GAS TURBINE ENGINE WITH POWER MODULATION CAPABILITY

BACKGROUND OF THE INVENTION

This invention relates to gas turbine engines and, more particularly, to a low-cost device for increasing the power output of gas turbine engines at low ambient inlet temperatures.

Gas turbine engine power output is related to the temperature of the ambient air entering the compressor portion of the engine. Typically, at rated turbine inlet temperature, as the ambient temperature decreases, power output increases. However, at an established lower limit of temperature (which varies with each engine design) power output may cease to increase and, in fact, may decrease. It is extremely desirable in modern gas turbine engines, particularly those of the turboshaft variety which are used for industrial or marine applications in cold climates, to forestall the onset of power decay with decreasing temperature and, in fact, to reverse the trend if possible.

The problem finds its origin in the inherent characteristics of the components of a gas turbine engine, particularly the compressor and turbine. The compressor is limited by the amount of corrected inlet flow that it can pass, corrected inlet flow being equal to the physical mass flow times a factor proportional to the square root of the ambient inlet temperature (and other factors irrelevant for purposes of this discussion). In a compressor, the corrected flow limit is normally controlled by limiting the compressor's corrected rotational speed. Furthermore, the significant rotational speed characteristic of a gas turbine engine compressor is its corrected rotational speed which equals its physical rotational speed divided by a factor proportional to the square root of ambient inlet temperatures. The turbine, on the other hand, is limited by an actual physical temperature value dependent upon the properties of the materials of which it is fabricated and cooling systems employed, if any.

During operation, as ambient inlet temperatures decrease and corrected speed is increased (as by a throttle advance) to maintain maximum rated turbine inlet temperature, compressor corrected flow and physical mass flow increase rapidly until the flow limit is reached. Power, which is a function of turbine inlet temperature and mass flow, thus increases. However, operation above this flow limit may stall the compressor. Therefore, at even lower inlet temperatures, engine physical speed must be reduced to maintain the maximum compressor flow and stall margine which, in turn, reduces the turbine inlet temperature to less than its rated value and decreases its power output. The problem is one of how rated turbine inlet temperature at maximum compressor flow can be maintained to increase power output at low ambient inlet temperatures. In other words, it is a problem of how the flow-temperature relationship of the gas turbine engine can be varied to modulate power output, particularly at low ambient inlet conditions.

Solutions to this problem have been proposed in the past. For example, it has been proposed to recycle at least a portion of the hot turbine exhaust gases back into the compressor inlet, thereby raising the inlet temperature to increase power at cold ambient temperatures. However, this method cannot show a power gain at low temperatures because the physical mass flow through the engine is reduced at high air inlet temperatures.

In the case of a gas turboshaft engine having a core engine and an independent power turbine downstream of the core engine and driven by the hot gases of combustion, a variable area power turbine nozzle diaphragm of a well-known variety could be used to effect a change in the flow-temperature characteristics of the core engine. Such modulation is apparent to those familiar with such gas turbine engines and the mechanism need not be pursued in detail herein. However, it will also be appreciated and recognized by those familiar with such art that the power turbine nozzle area reduction which would be required for cold-day operation results in reduced compressor stall margin, potentially large shifts in the core engine rotor thrust loads and possible reduction in power turbine efficiency. Additionally, a variable area power turbine nozzle would increase the expense fo designing, controlling and maintaining the engine.

Two other approaches toward obtaining greater cold-day power would be to add an additional stage to the front of the core engine compressor (commonly referred to as "zero staging" the compressor) and to add a variable area capability to the core engine turbine nozzle. However, it should be appreciated that lightweight gas turbine engines for industrial and marine applications are usually derivatives of proven aircraft gas turbine engines and that it is desirable from both the economic and reliability standpoints to maintain commonality of hardware. Both of the aforementioned approaches could result in a virtual redesign of the core engine and are, therefore, undesirable.

It is clear, therefore, that none of the above solutions is entirely satisfactory in solving the low temperature power output problem. What is needed is a low-cost, reliable and efficient method of increasing the power output at low ambient inlet temperatures.

SUMMARY OF THE INVENTION

Accordingly, it is the primary object of the present invention to provide a simple device for modulating the power output level of a gas turbine engine.

It is another object to provide a method of modulating the power output of a gas turbine engine.

It is another object of the present invention to increase the power output of a gas turbine engine power turbine at low values of the ambient inlet temperature.

These and other objects and advantages will be more clearly understood from the following detailed descriptions, the drawings and specific examples, all of which are intended to be typical of rather than in any way limiting on the present invention.

Briefly stated, the above objectives are attained in one embodiment of the present invention by providing a gas turbine engine with a power modulating device comprising a conduit for bypassing a portion of the compressor discharge air around the combustor and for reintroduction of the portion back into the engine power cycle downstream of the compressor-driving turbine. In the case of a turboshaft engine having a core engine and an independently driven power turbine, the bypass portion is reintroduced between the core engine turbine and the power turbine. A valve is used to modulate the amount of bypass flow and, at high compressor inlet temperatures, the valve is closed allowing no bypass flow. However, at cold inlet temperatures, the valve may be opened allowing the necessary bypass flow to increase or maintain the core turbine inlet temperature to its rated value at maximum compressor flow. In particular, when the valve is opened, fuel flow must increase in order to maintain the compressor flow level, resulting in an increase in the core engine turbine inlet temperature. Additionally, since all of the compressor flow passes through the power turbine and since its average temperature is raised due to the increased fuel flow, the available power at the power turbine is increased over that available without bypass flow.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

DESCRIPTION OF THE PREFERRED EMBODIMENT

Figure 1:
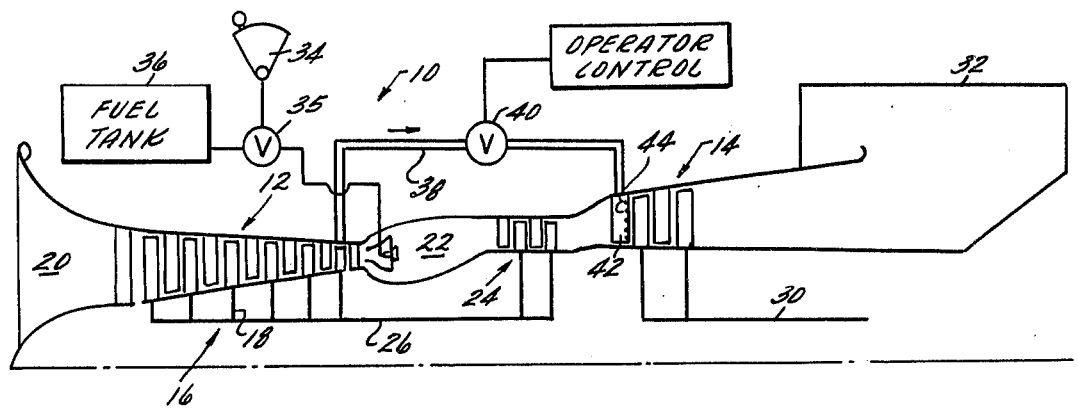
FIG. 1 is a schematic side view, in partial cross section, of a simplified gas turboshaft engine incorporating the power modulating device of the subject invention.

Referring to the drawings wherein like numerals correspond to like elements throughout, reference is first directed to FIG. 1 wherein a gas turbine engine depicted generally at 10 and embodying the thrust modulating device of the present invention is diagrammatically shown. This engine may be considered as comprising a core engine 12 and an independent power turbine 14. The core engine includes an axial flow compressor 16 having a bladed rotor 18. Air enters inlet 20, is compressed by compressor 16 and then is discharged to a combustor 22 where it is mixed with fuel and combusted to provide high energy combustion gases to drive the core engine turbine (often referred to as the high pressure turbine) 24. Turbine 24, in turn, drives rotor 18 through shaft 26 in the usual manner of a gas turbine engine. The hot gases of combustion then pass through and drive the power turbine 14 which, in turn, drives an energy-absorbing device (not shown) through power shaft 30. Power is thus obtained by the action of the hot gases of combustion driving power turbine 14. The products of combustion are then collected and exhausted through discharge nozzle 32 which, in some applications, may be a propulsive nozzle. The above description is typical of many present-day gas turbine engines and is not meant to be limiting on the present invention since it will soom become readily apparent from the following description that the present invention is capable of application to any gas turbomachine, whether of the turbojet, turboprop or turboshaft variety. The foregoing description of the operation of the engine of FIG. 1 is, therefore, merely meant to be illustrative of one type of application.

Figure 2:
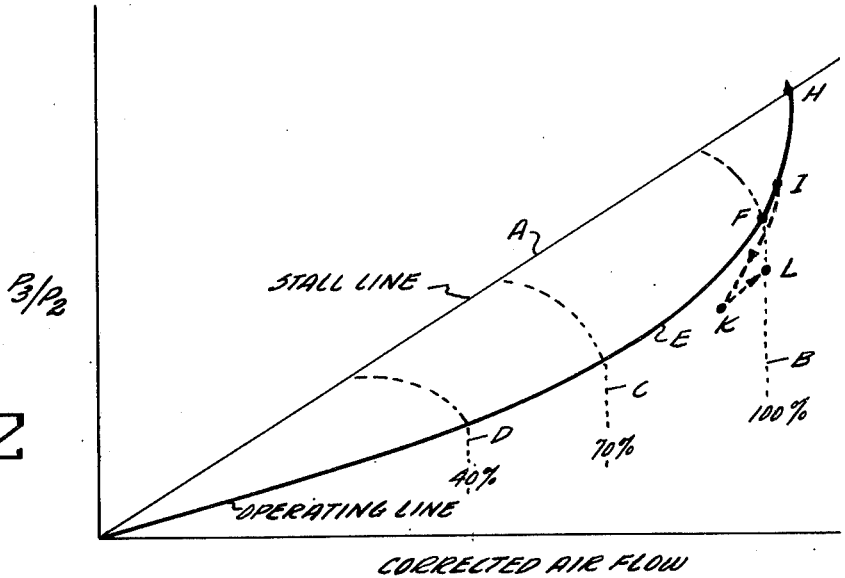
FIG. 2 is a plot of certain compressor relationships comprising what is commonly known as a compressor map.

Attention is now directed to FIG. 2 which illustrates what is commonly referred to as a compressor map. As is the case with FIG. 1, the relationships illustrated in FIG. 2 are not intended to relate to any specific compressor but simply illustrate the relationship of certain parameters which are generally applicable to any compressor. Basically, this compressor map shows the relationship between the pressure rise across the compressor to the corrected mass airflow through the compressor. As used herein, pressure rise is referred to as $P_3/P_2$ where $P_3$ is the pressure of air discharged from the compressor and $P_2$ is the pressure of the ambient air entering the compressor. Also, corrected airflow comprises physical mass flow $\times \sqrt{\theta_2}/\delta_2$ (i.e., flow$_{corrected}$=flow$_{actual}\sqrt{\theta_2}/\delta_2$, where $\theta_2$=ambient inlet total temperature ($T_2$) divided by a constant and $\delta_2 = P_2$ divided by a different constant). A stall line (labeled A) indicates the minimum airflow through the compressor for any given value of $P_3/P_2$ necessary to prevent stall. Any point above this line indicates a compressor pressure ratio $P_3/P_2$ which is too high for the existing corrected airflow. Speed lines (labeled B, C, D) representing the corrected rotational speed of the compressor rotor, illustrate that corrected airflow generally increases with increasing speed and that higher pressure ratios and, consequently, higher energy output levels are obtained at higher speeds. As used herein, corrected speed refers to the actual rotational speed divided by $\sqrt{\theta_2}$.

During normal engine operation, in order to provide satisfactory stall-free operation of the compressor, the compressor migrates along an operating line (labeled E), the vertical position of which with respect to the stall line being normally established by the core engine turbine nozzle exit area (the minimum area "hole" through which the flow must pass). This operating line, as compressor rotor speed increases, eventually intersects the stall line (point H) at what would be the theoretical maximum energy output capability of the compressor, the steep upturn in the operating line being caused by decreasing compressor efficiency as speed increases. Conventionally, 100% engine speed (line B) is selected below the maximum energy capability of the compressor to give a margin of safety from stall (hereinafter referred to as "stall margin") and the point where the 100% engine speed line B intersects the operating line E is referred to as the design point (labeled F).

Figure 3:
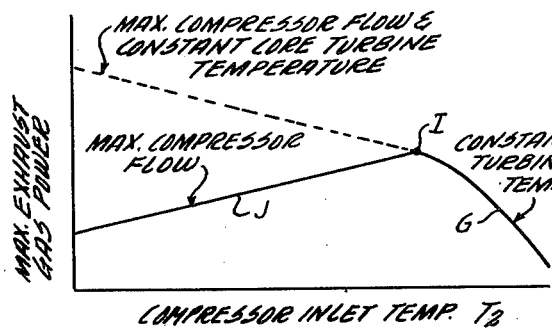
FIG. 3 is a plot depicting the relationship of engine power and compressor inlet ambient temperature with and without incorporation of the subject invention.

Referring now to FIG. 3, there is depicted generally the relationship between power turbine power output (or maximum exhaust gas power) and compressor inlet ambient temperature $T_2$ for an engine similar to that of FIG. 1. However, it is to be understood that the relationships of FIG. 3 are not intended to relate to any specific engines but are merely illustrative of many gas turbine engines. Since power is a function of turbine inlet temperature and the mass flow therethrough, it is desirable to operate at both maximum rated turbine inlet temperature and maximum compressor flow.

As compressor inlet temperature drops at constant core engine turbine inlet temperature, the power output from power turbine 14 increases along the representative line labeled G in FIG. 3. Contemporaneously, corrected engine speed and corrected airflow increase with decreasing inlet ambient temperature. However, in order to maintain rated turbine temperature (the temperature ratio across the compressor being substantially constant) engine speed msut be further increased as by advancing the throttle 34 which controls valve 35 and modulates the rate of fuel flow from fuel tank 36 to combustor 22 (FIG. 1). This causes the compressor corrected flow to increase rapidly as the compressor migrates along its operating line from point F toward the stall line point H (FIG. 2). At some point labeled I, the essentially maximum flow limit of the compressor is reached and the maximum power level from turbine 14 is obtained. Operation above this flow limit will potentially stall the compressor due to the sharply rising operating line E. Thus, at inlet ambient temperatures lower than this value, the engine physical speed must be reduced (as by retarding the throttle) to maintain the maximum corrected compressor flow and stall margin (point I of FIG. 2) and this, in turn, reduces the turbine temperature to less than the rated value and also reduces the power output of power turbine 14. On the power plot of FIG. 3, this turbine power decrease with decreasing temperature would be along a representative line labeled J.

Figure 4:
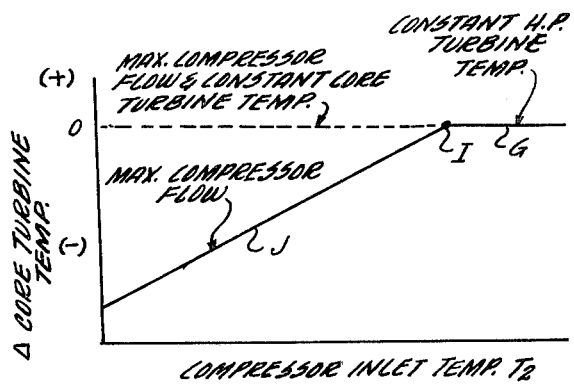
FIG. 4 is a plot depicting the variation in turbine inlet temperature while the engine is operated according to the relationship of FIG. 3.

FIG. 4 represents the change in turbine inlet temperature corresponding to the representation of turbine power in FIG. 3, and similarly labeled curves and points represent corresponding operating conditions. This figure graphically depicts how rated turbine inlet temperature can be held constant until maximum compressor flow is reached (point I) at which time the throttle must be retarded with decreasing inlet temperature (line J representing maximum compressor flow operation). The problem, therefore, is how to maintain rated turbine inlet temperatures at maximum compressor flow to increase the power output at low ambient inlet temperatures.

The present invention is designed to solve this problem and to provide power modulation at low ambient inlet temperatures. Referring again to FIG. 1, it is shown schematically that the engine is provided with a device for modulating the power output of the power turbine comprising a bypass conduit 38 having a flow modulating valve 40 interposed therein. One end of this bypass conduit is connected to compressor 16 at its discharge end, and valve 40 is actuated by the engine operator to bleed off a certain amount of compressor discharge air, thereby reducing the airflow through the combustor 22 and core engine turbine 24. The conduit reintroduces the bleed portion back into the power cycle downstream of turbine 24 and, more particularly in the embodiment of FIG. 1, between turbines 24 and 14. Thus, conduit 38 serves as a simple example of a means for bypassing a portion of the compressor discharge air around the combustor and for introducing the air back into the cycle. The means for introducing may also comprise a plurality of hollow nozzle vanes 42 (only one of which is shown for clarity) to which conduit 38 is connected at its downstream end, the bypass air being emitted through a plurality of holes 44 along the trailing edge of each such strut to provide more thorough mixing of the gases. It is again emphasized that the bypass air is shown re-entering the engine cycle at the power turbine nozzle vanes only by way of example, and that it may re-enter the cycle anywhere between the core engine and power turbine nozzle throat.

Valve 40 comprises one example of a means for modulating the bypass flow rate and at high compressor inlet ambient temperatures, the valve is closed allowing no bypass flow. However, at cold inlet temperatures, the valve is opened allowing that amount of bypass flow necessary to maintain rated core turbine inlet temperature at maximum compressor flow. The colder the ambient temperature, the greater the bypass flow. Referring again to FIGS. 2-4, attention is first directed to FIG. 2 where, for ease of explanation, the operation of the compressor with bypass flow is shown in two steps which generally follow the heavier dashed lines. Assuming that the compressor is operating at point I at maximum compressor flow and rated turbine inlet temperature, as ambient inlet temperature decreases further, valve 40 is opened to increase the bypass flow rate through conduit 38 while holding throttle position constant. As a result, the compressor operating point migrates from point I to point K whereupon a throttle advance up to point L (at constant percent bypass flow) restores the maximum compressor flow rate and increases the core turbine inlet temperature to its rated value, thus maintaining core turbine power to drive the compressor. Contemporaneously, as a result of the foregoing, the power turbine inlet temperature increases (the increase in temperature through the core engine turbine more than offsetting the reduction in temperature due to mixing of the bypass flow) and flow therethrough is unchanged (since all of the flow has been recombined prior to passage through the power turbine). Therefore, the power output is increased.

Practically speaking, the positions of throttle 34 and valve 40 could be modulated independently and contemporaneously by an operator to increase the power output as described above. A simple device (not shown) which measures and registers turbine 24 inlet temperature could be monitored to give an indication of engine performance. However, it is also clear that a more sophisticated control could be developed to automatically perform this function, but such a control is beyond the scope of the present invention. The invention is operative, in its simplest form, with independent modulation of throttle 34 and valve 40.

Referring now to FIGS. 3 and 4, it is shown that by the use of the present invention maximum compressor flow and rated core engine turbine inlet temperature may be maintained with decreasing compressor ambient inlet temperature (dotted line of FIG. 4) and that, as a result, power output continues to rise (dotted line of FIG. 3). Thus, the present invention provides the capability for exceeding the previously established maximum power versus inlet ambient temperture relationship (solid line J of FIG. 3) through the unique relationship of bypass flow and throttle position and that, through the use of the present invention, the flow-temperature relationship through a turbine may be modulated.

It should be obvious to one skilled in the art that certain changes can be made to the above-described invention without departing from the broad inventive concepts thereof. For example, by use of the present invention it is theoretically possible to increase power output even though compressor flow rate decreases slightly. Additionally, an engine incorporating the present invention can compensate for normal engine deterioration. Such an engine will normally run hotter and slower than a new engine, thus producing less power. However, the power level can be easily restored by reducing the bypass flow rate consistent with the principles taught hereinabove. Furthermore, it is clear that the invention is not limited to the turbojet engine depicted in FIG. 1 since, in its simplest form, it represents a device for modulating the flow-temperature relationship at the inlet of a simple turbojet engine having a single turbine driving the compressor. Furthermore, it is contemplated that in some gas turbine engines it may be desirable to extract the bypass air from the compressor at a location somewhat upstream of the compressor discharge. It is intended that the appended claims cover these and all other variations in the present invention's broader inventive concepts.

Having thus described the invention, what is claimed as novel and desired to be secured by Letters Patent of the United States is:

1. In a gas turbine engine having a compressor for pressurizing a flow of air, a combustor in which compressed air is mixed with fuel and combusted, a turbine driven by the hot gases of combustion and drivingly connected to said compressor, and a separate power turbine said engine characterized by a predetermined relationship of power output versus compressor inlet ambient temperature at maximum compressor flow, a device for modulating the engine power output at a low ambient temperature comprising means for bypassing a portion of the air discharged from the compressor around the combustor and for reintroducing the portion into the cycle between the compressor and power turbines, means for modulating the bypass flow rate, and a throttle for modulating fuel flow rate, the resulting power level thereby exceeding the predetermined relationship at the same low ambient temperature.

2. A gas turbine engine comprising: a core engine having a compressor for pressurizing a flow of air, a combustor in which pressurized air is mixed with fuel and combusted, and a core engine turbine driven by the hot gases of combustion and drivingly connected to the compressor; a power turbine downstream of said core engine and independently driven by the hot gases of combustion exiting the core engine turbine; said engine possessing an operating characteristic whereby power turbine work extraction increases as compressor inlet temperature decreases until a relatively low inlet temperature level is obtained while contemporaneously maintaining a rated power turbine inlet temperature through an increase of the fuel flow rate into the combustor, the power turbine work extraction thereafter decreasing with further reductions in compressor inlet temperature as a result of compressor airflow and stall margin limitations; said engine further comprising means for increasing the power turbine work extraction at compressor inlet temperatures below the relatively low inlet temperature level including means for bypassing a portion of the air discharged from the compressor around the core engine turbine and for introducing the bypass portion into the engine cycle between the core engine turbine and the power turbine; means for increasing the fuel flow rate into the combustor contemporaneous with the passage of the bypass flow; and means for modulating the bypass flow rate such that an increasing rate is associated with increased power turbine work extraction.

3. In a method of increasing the temperature of a gas flow entering a power turbine disposed downstream of a core engine having a compressor for pressurizing a flow of air, a combustor in which pressurized air is mixed with fuel and combusted, and a core engine turbine driven by the hot gas flow of combustion products and drivingly connected to the compressor, the steps of:

bypassing a portion of the compressor discharge air around the core engine turbine;

increasing the rate of fuel flow into the combustor to increase the fuel-air ratio within the combustor;

reintroducing the bypass air into the engine cycle between the core engine turbine and the power turbine while contemporaneously maintaining the compressor discharge airflow substantially constant; thereby increasing the power output of the power turbine.

* * * * *